3,712,869
PROCESS OF DECOMPOSITION OF 1,1,1,2-TETRACHLOROETHANE

Correia Yves, Saint-Auban, and Clair Rene, Savigny, Seine, Orge, France, assignors to Produits Chimiques Pechiney-Saint Gobain, Neuilly-sur-Seine, France
No Drawing. Filed June 9, 1970, Ser. No. 44,859
Claims priority, application France, June 18, 1969, 6920313
Int. Cl. B01j 1/16
U.S. Cl. 252—407   5 Claims

ABSTRACT OF THE DISCLOSURE

This invention is addressed to a new and improved method for inhibiting the decomposition of 1,1,1,2-tetrachloroethane and an inhibited composition formed thereby wherein an inhibitor consisting essentially of an aliphatic aldehyde, an aromatic aldehyde, chlorinated derivatives of the foregoing aldehydes which are soluble in 1,1,1,2-tetrachloroethane with other chlorinated solvents, or cyclic trimers of aliphatic aldehydes and mixtures thereof are added to a solvent composition containing 1,1,1,2-tetrachloroethane.

---

This invention relates to the inhibition of the decomposition of 1,1,1,2-tetrachloroethane or of mixtures of chlorinated hydrocarbons containing 1,1,1,2-tetrachloroethane.

It is known that 1,1,1,2-tetrachloroethane is unstable when subjected to heat in the presence of either metals, such as among others, iron and its alloys, copper and its alloys, nickel and its alloys, or chlorides of various metals, and particularly chlorides of iron. For example, in the presence of ferric chloride, 1,1,1,2-tetrachloroethane is unstable to heat as is described in U.S. Pat. No. 2,593,451.

This instability results in the decomposition of 1,1,1,2-tetrachloroethane with the concomitant release of hydrochloric acid vapor and the formation of trichloroethylene and tarry residues.

The problem of the decomposition of 1,1,1,2-tetrachloroethane also exists when 1,1,1,2-tetrachloroethane is subjected to distillation, rectification, evaporation and/or concentration operations. In such operations, 1,1,1,2-tetrachloroethane is generally in admixture with other chlorinated hydrocarbons, particularly the $C_2$ chlorinated hydrocarbons, in the form of effluent from a reactor used in the manufacture of chlorinated hydrocarbons by numerous processes, including, among others, vapor phase or liquid phase, thermal or catalytic chlorination of hydrocarbons and/or chlorinated hydrocarbons, or catalytic oxychlorination and dehydrochlorination. The isolation of a specific chlorinated hydrocarbon or of specific chlorinated hydrocarbons included in the reactor effluent requires the treatment of the reactor effluent mixture in distillation columns, evaporators, purifiers, exchangers and driers. This equipment, as well as the ducts which connect them, are frequently formed of metallic alloys containing iron, such as ordinary steel or stainless steel. It has been observed that decomposition of 1,1,1,2-tetrachloroethane arises principally in the liquid phase of the boiler at a temperature within the range of 80–250° C., and that the rate of decomposition of the 1,1,1,2-tetrachloroethane is defined by the ratio of evolved hydrochloric acid to the molar flow of 1,1,1,2-tetrachloroethane. This rate of decomposition at the feed of the distillation column may attain as high as 0.50.

It is accordingly an object of the present invention to inhibit the decomposition of 1,1,1,2-tetrachloroethane and thereby improve the distillation, rectification, evaporation and or concentration operations to which 1,1,1,2-tetrachloroethane and mixtures of 1,1,1,2-tetrachloroethane with other chlorinated hydrocarbons which are brought into contact with surfaces catalysing the decomposition of 1,1,1,2-tetrachloroethane.

In accordance with the practice of the present invention, the inhibition of 1,1,1,2-tetrachloroethane against decomposition is achieved by incorporating into the 1,1,1,2-tetrachloroethane an inhibitor consisting essentially of an aliphatic aldehyde containing 2–7 carbon atoms, an aromatic aldehyde containing 7–12 carbon atoms, a cyclic trimer of an aliphatic aldehyde containing 1–3 carbon atoms, a chlorinated derivative of the aliphatic or aromatic aldehyde which is soluble in 1,1,1,2-tetrachloroethane or a mixture of 1,1,1,2-tetrachloroethane with other chlorinated solvents, or mixtures of the foregoing.

According to the invention, the amount of the inhibitor which is used in order to inhibit the decomposition of 1,1,1,2-tetrachloroethane is dependent upon the gram-atom concentration of the metal contaminant or the amount of metal which is present in the composition in the dissolved or suspended state. The amount of inhibitor used should generally be an amount sufficient to provide a ratio of one mole of inhibitor per gram-atom of metal present. Preferably, the inhibitor is used in an amount such that there is an excess of inhibitor with respect to the gram-atom concentration of the metal present. In accordance with the most preferred embodiment of the invention, there is used an excess of inhibitor corresponding from 2–100 times the proportion stated above.

Representative of the inhibitors which can be used in the practice of this invention, are trioxane, paracetaldehyde, cyclic trimer of propionaldehyde, chloral, propionaldehyde, cinnamaldehyde, anisaldehyde, salicylaldehyde, butyraldehyde, isobutyraldehyde, benzaldehyde or mixtures thereof. The most preferred inhibitors for use in accordance with the practice of the invention are butyraldehyde, isobutyraldehyde, benzaldehyde, mixtures of butyraldehyde and benzaldehyde or a mixture of isobutyraldehyde and benzaldehyde.

The incorporation of the inhibitor of the invention into the 1,1,1,2-tetrachloroethane or the mixture of 1,1,1,2-tetrachloroethane with other chlorinated solvents can be achieved either before the entrance of the solvent composition into the evaporator, the distillation column, the concentration column or the rectification column, or at the entrance to the column. It is also possible to add the inhibitor of the present invention to the composition contained in the boiler of the column.

In order to incorporate into the 1,1,1,2-tetrachloroethane or the solvent mixture containing 1,1,1,2-tetrachloroethane the optimum quantity of the inhibitor, it is frequently advisable to determine the gram-atom concentration of metal present in the 1,1,1,2-tetrachloroethane or solvent composition during the course of the distillation, concentration, rectification or evaporation operations.

Having described the basic concept of the invention, reference is now made to the following examples, which are provided by way of illustration, and not by way of limitation, of the practice of the invention.

EXAMPLE 1

Into an ordinary steel vessel having a capacity of about 500 cm.³ equipped with a condenser, and means to maintain a nitrogen pressure of about 500 g. on the liquid contained in the vessel while permitting the continuous escape of gases which are passed into a water washer, there is introduced 200 cm.³ of a solvent mixture comprising 67 mole percent of 1,1,2,2-tetrachloroethane, 20 mole percent of 1,1,1,2-tetrachloroethane, 13 mole percent of pentachloroethane and 100 mg. (1.39 millimoles) of n-butyraldehyde. The vessel is immersed in a bath maintained at a temperature of 170° C. to reflux the solvent mixture at a temperature of about 159° C. After about 1 hour, the acidity of the water washer is analyzed, and it is found that between 20–35 cm.³ of a normal sodium hydroxide has been neutralizing, the acidity corresponding to a decomposition of 1,1,1,2-tetrachloroethane of about 5.2 to 9.4 mole percent. Chromatographic analysis confirms that 1,1,1,2-tetrachloroethane is converted to trichloroethylene.

By way of comparison, tests are carried out in the absence of n-butyraldehyde, and it is found that the mixture refluxes, after the first hour, at a temperature within the range of 140–150° C., depending upon the tests. The acidity of the wash water is sufficient to neutralize between 150–300 cm.³ of a normal sodium hydroxide solution corresponding to a 1,1,1,2-tetrachloroethane decomposition of 39–78 mole percent based upon the quantity of 1,1,1,2-tetrachloroethane originally present in the solvent composition.

EXAMPLE 2

Into an Arcap vessel (which is formed of an alloy containing principally nickel and copper at a ratio of about 30/70) having a capacity of about 500 cm.³, are introduced 200 cm.³ of the solvent mixture utilized in Example 1, 8 mg. of $FeCl_3$ (0.049 mg.-atoms of Fe) and 100 mg. (1.72 millimoles) of propionaldehyde. By means of the apparatus described in Example 1, the resulting mixture is refluxed, and the hydrochloric acid evolved is analyzed in the water washer. The chromatographic analysis of the product reveals that, over a period of 24 hours, there is produced an average hourly decomposition of the 1,1,1,2-tetrachloroethane of about 0.004 mole percent.

By way of comparison, when a test is carried out in the same manner as described above but without the propionaldehyde it is observed, after a period of about 8 hours, the decomposition of 1,1,1,2-tetrachloroethane is from 6–11 mole percent based upon the 1,1,1,2-tetrachloroethane originally present.

EXAMPLE 3

Into a Monel vessel (which is formed of an alloy containing principally nickel and copper in a ratio of about 70/30) having a capacity of about 500 cm.³, there is introduced 200 cm.³ of the solvent mixture utilized in Example 1, 8 mg. of $FeCl_3$ (0.049 mg.-atoms of Fe) and 50 mg. (0.56 millimoles) of trioxane, and the resulting mixture is refluxed at a temperature of about 158° C. The hydrochloric acid analyzed in the water washer, and the chromatographic analysis of the solvent indicates that over a period of 24 hours, there is produced an hourly decomposition of 1,1,1,2-tetrachloroethane into trichloroethylene of 0.006 mole percent.

EXAMPLES 4–10

The following examples represent tests carried out in the Monel vessel described in Example 3 in the presence of 12 mg. of $FeCl_3$ (0.074 mg.-atoms of Fe) and with various aldehydes as shown in the following table. The results are as follows:

| Example | Stabilizer | Quantity in millimole | Duration of the test in hours | Average hourly decomposition, mole percent |
|---|---|---|---|---|
| 4 | Paracetaldehyde | 0.076 | 8 | 1 |
| 5 | Isobutyraldehyde | 1.39 | 8 | 0.3 |
| 6 | Benzaldehyde | 1.13 | 9 | 3 |
| 7 | Salicylaldehyde | 0.98 | 8 | 2.1 |
| 8 | {Isobutyraldehyde | 1.00 | 8 | 0.25 |
|   | Benzaldehyde | 1.00 | | |
| 9 | Cinnamaldehyde | 0.83 | 8 | 0.10 |
| 10 | Anisaldehyde | 0.80 | 8 | 0.09 |

EXAMPLE 11

Into a continuous distillation column, there is fed a feed composition, with a resultant formation of a distillation residue, a distillate and vented gases. The feed mixture introduced to the column is a mixture of organic chlorinated compounds containing 6 mg. of dissolved iron (1.75 mg.-atom) per kg. of feed mixture. The composition of the feed mixture is shown in the following table. To the feed mixture there is added 120 mg. of n-butyraldehyde (1.77 millimoles) per kg. of feed mixture. Distillation of this mixture is carried out at a pressure of about 1.4 bar. The average retention time in the boiler portion of the column is about 5 hours. The molar balance based upon the feed to the column is shown as follows:

| Compounds | Feed | Distillation residue | Distillate | Air-hole exhaust vent | Moles of trichloroethylene formed | Moles of 1,1,1,2-tetrachloroethane converted |
|---|---|---|---|---|---|---|
| HCl | | | | 6.70 | | |
| $CV_2$ | 0.352 | | 0.352 | | | |
| T111 | 2.680 | | 2.680 | | | |
| Tri | 5.360 | 0.030 | 12.030 | | 6.70 | |
| T112 | 0.076 | | 0.076 | | | |
| Per | 0.179 | | 0.179 | | | |
| T4D | 48.000 | 18.350 | 22.950 | | | 6.70 |
| T4S | 27.500 | 27.500 | | | | |
| Penta | 15.460 | 15.460 | | | | |
| Heavy | 0.393 | 0.393 | | | | |
| Total | 100.000 | 61.733 | 38.267 | 6.70 | 6.70 | 6.70 |

NOTE.—Designation of the different abbreviations of the above-mentioned compounds are as follows:

HCl—Hydrochloric acid.
$CV_2$—Vinylidene chloride.
T111—1,1,1-trichloroethane.
Tri—Trichloroethylene.
T112—1,1,2-trichloroethane.
Per—Perchloroethylene.
T4D—1,1,1,2-tetrachloroethane.
T4S—1,1,2,2-tetrachloroethane.
Penta—Pentachloroethane.
Heavy—$C_3$, $C_4$ chlorinated hydrocarbons.

Designation of the different abbreviations of the abovementioned compounds are as follows:

It is found that the 1,1,1,2-tetrachloroethane decomposes in the presence of iron whereas the other compounds are stable including the 1,1,2,2-tetrachloroethane.

By way of comparison, the same distillation process is carried out under the same pressure and on the same mixture of organic compounds of that of Example 11 containing the same quantity of iron, but without having added n-butyraldehyde therein.

The results of the molar balance of the column are the following:

| Compounds | Feed | Distillation residue | Distillate | Air-hole exhaust vent | Moles of trichloroethylene formed | Moles of 1,1,1,2-tetrachloroethane converted |
|---|---|---|---|---|---|---|
| HCl | | | | 10.1 | | |
| $CV_2$ | 0.352 | | 0.352 | | | |
| T111 | 2.680 | | 2.680 | | | |
| Tri | 5.360 | 0.050 | 15.410 | | 10.1 | |
| T112 | 0.076 | | 0.076 | | | |
| Per | 0.179 | | 0.179 | | | |
| T4D | 48.000 | 15.000 | 22.400 | | | 10.1 |
| T4S | 27.500 | 27.500 | | | | |
| Penta | 15.460 | 15.460 | | | | |
| Heavy | 0.393 | 0.393 | | | | |
| Total | 100.000 | 58.903 | 41.087 | 10.1 | 10.1 | 10.1 |

Thus, the introduction of n-butyraldehyde to the 48 moles of 1,1,1,2-tetrachloroethane results in the reduction in the decomposition of 1,1,1,2-tetrachloroethane from 10.1 to 6.7 moles of 1,1,1,2-tetrachloroethane decomposed into trichloroethylene and gaseous HCl.

It will be apparent from the foregoing that we have provided a new and improved method and composition for use in inhibiting 1,1,1,2-tetrachloroethane either alone or in admixture with other chlorinated solvents. The method of the present invention sufficiently improves the stability of 1,1,1,2-tetrachloroethane in the presence of metals which otherwise catalyze the decomposition of the 1,1,1,2-tetrachloroethane into trichloroethylene and HCl.

It will be understood that various changes and modifications may be made in the details of formulation, pro-

What is claimed is:

1. A composition having improved stability in the presence of metals consisting essentially of 1,1,1,2-tetrachloroethane and an inhibitor consisting essentially of a compound selected from the group consisting of propionaldehyde, butyraldehyde, isobutyraldehyde, chloral, aromatic aldehydes containing 7–12 carbon atoms, chlorinated derivatives of said aromatic aldehydes which are soluble in 1,1,1,2-tetrachloroethane, cyclic trimers of aldehydes selected from the group consisting of formaldehyde, acetaldehyde and propionaldehyde and mixtures thereof, said inhibitor being present in a ratio of 1 to 100 moles per gram atom of metal.

2. A composition as defined in claim 1 wherein said inhibitor is selected from the group consisting of trioxane, paracetaldehyde, the cyclic trimer of propionaldehyde, chloral, propionaldehyde, cinnamaldehyde, anisaldehyde, salicylaldehyde, butyraldehyde, isobutyraldehyde, benzaldehyde and mixtures thereof.

3. A composition as defined in claim 1 wherein said inhibitor is selected from the group consisting of butyraldehyde, isobutyraldehyde benzaldehyde, a mixture of butyraldehyde and benzaldehyde, and a mixture of isobutyraldehyde and benzaldehyde.

4. A composition as defined in claim 1 wherein said composition also includes at least one other chlorinated solvent.

5. A composition as defined in claim 1 wherein the 1,1,1,2-tetrachloroethane is in the form of a reactor effluent from the preparation of chlorinated hydrocarbons.

References Cited

UNITED STATES PATENTS

| | | | |
|---|---|---|---|
| 3,360,575 | 12/1967 | Brown | 260—652.5 R |
| 3,564,061 | 2/1971 | Correia et al. | 260—652.5 R |
| 3,357,922 | 12/1967 | Bellinger | 252—170 X |

MAYER WEINBLATT, Primary Examiner

U.S. Cl. X.R.

252—170, 171; 260—652.5 R

UNITED STATES PATENT OFFICE
CERTIFICATE OF CORRECTION

Patent No. 3,712,869　　　　　　Dated January 23, 1973

Inventor(s) Yves CORREIA and Rene CLAIR

It is certified that error appears in the above-identified patent and that said Letters Patent are hereby corrected as shown below:

Column 1, line 4, change the inventors names to

-- Yves Correia -- and -- Rene Clair -- after "Savigny" delete the comma (,) and insert therefor a hyphen (-)

Column 1, line 5, delete "Seine," and insert therefor -- sur- --

Column 4, delete lines 34-35.

Signed and sealed this 14th day of August 1973.

(SEAL)
Attest:

EDWARD M. FLETCHER, JR.　　　　RENE D. TEGTMEYER
Attesting Officer　　　　　　　　Acting Commissioner of Patents